United States Patent
Kalauch

(10) Patent No.: US 9,303,598 B2
(45) Date of Patent: Apr. 5, 2016

(54) DEVICE FOR AERATION AND VENTILATION OF A FUEL SYSTEM

(75) Inventor: Gerd Kalauch, Oberndorf (DE)

(73) Assignee: AUDI AG, Ingolstadt (DE)

( * ) Notice: Subject to any disclaimer, the term of this patent is extended or adjusted under 35 U.S.C. 154(b) by 594 days.

(21) Appl. No.: 13/010,214

(22) Filed: Jan. 20, 2011

(65) Prior Publication Data

US 2011/0180466 A1   Jul. 28, 2011

(30) Foreign Application Priority Data

Jan. 20, 2010   (DE) .......................... 10 2010 005 046

(51) Int. Cl.
| | |
|---|---|
| B01D 35/01 | (2006.01) |
| F02M 25/08 | (2006.01) |
| F16K 17/19 | (2006.01) |
| B60K 15/035 | (2006.01) |
| B01D 46/00 | (2006.01) |

(52) U.S. Cl.
CPC ...... *F02M 25/0836* (2013.01); *B60K 15/03519* (2013.01); *F02M 25/0854* (2013.01); *F16K 17/19* (2013.01); *B01D 46/0087* (2013.01); *B01D 46/0089* (2013.01)

(58) Field of Classification Search
None
See application file for complete search history.

(56) References Cited

U.S. PATENT DOCUMENTS

| | | | | |
|---|---|---|---|---|
| 3,616,783 | A | * | 11/1971 | Masters ......................... 123/519 |
| 3,769,952 | A | * | 11/1973 | Fiedler et al. .................. 123/518 |
| 3,825,147 | A | * | 7/1974 | Noponen et al. .......... 220/203.24 |
| 4,040,404 | A | * | 8/1977 | Tagawa .......................... 123/519 |
| 4,318,383 | A | * | 3/1982 | Iritani et al. .................... 123/520 |
| 5,564,466 | A | * | 10/1996 | Aoyama et al. ............. 137/493.8 |
| 5,850,819 | A | | 12/1998 | Kunimitsu |
| 5,858,034 | A | * | 1/1999 | Shida et al. ...................... 55/313 |
| 6,183,526 | B1 | * | 2/2001 | Suzuki ............................. 55/311 |

FOREIGN PATENT DOCUMENTS

| | | |
|---|---|---|
| DE | 69916674 T2 | 9/2004 |
| EP | 1729005 A1 | 12/2006 |
| WO | 2007090802 A1 | 8/2007 |

* cited by examiner

*Primary Examiner* — Terry Cecil
(74) *Attorney, Agent, or Firm* — Novak Druce Connolly Bove + Quigg LLP

(57) ABSTRACT

The invention relates to a device for aeration and ventilation of a fuel system of a motor vehicle, with a pipe union for connecting the device to the fuel system, the pipe union being connected via a connecting element to a three-way valve via which the pipe union can be fluid-connected alternately to an air inlet opening or an air outlet opening of the device. Furthermore, there is a filter element which is located in the flow path between the air inlet opening and the three-way valve. The filter element, the three-way valve, and the connecting element are accommodated in a common housing. An especially compact and space-saving device is devised by the integration of the three-way valve, connecting element, and filter element into one unit.

5 Claims, 2 Drawing Sheets

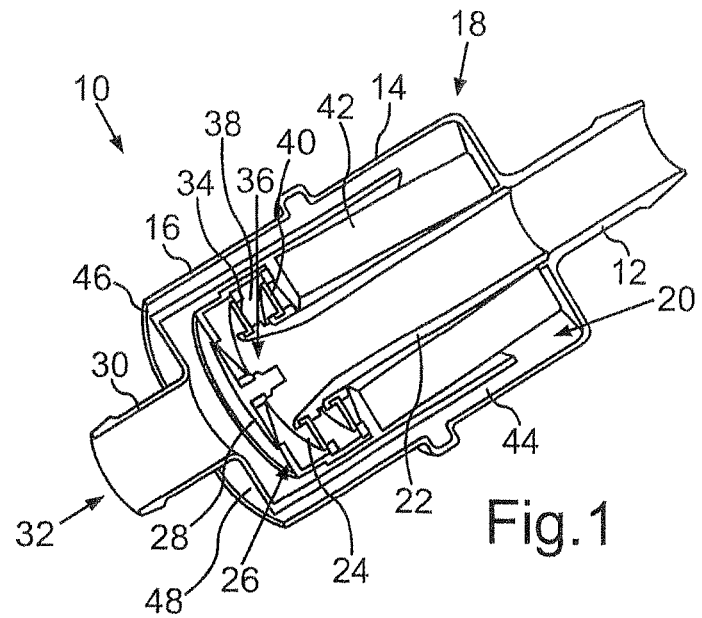
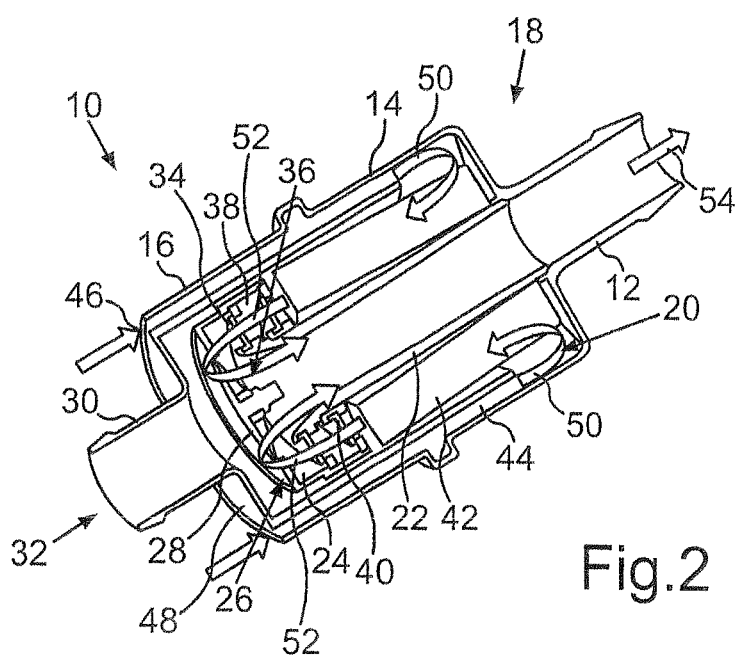

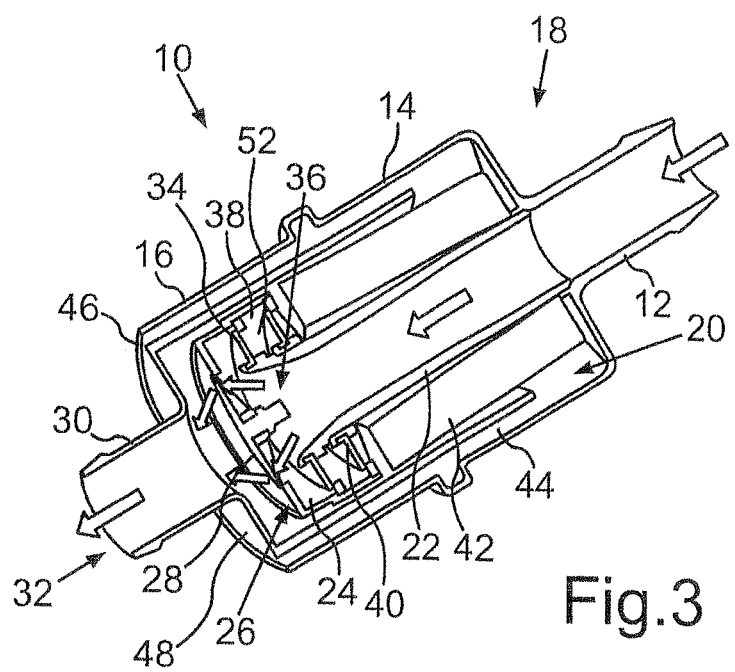

DEVICE FOR AERATION AND VENTILATION OF A FUEL SYSTEM

The invention relates to a device for aeration and ventilation of a fuel system of a motor vehicle.

BACKGROUND OF THE INVENTION

As a result of the volatility of gasoline and diesel fuels, in the fuel tanks of motor vehicles fuel vapors form which must be dissipated to prevent the generation of overpressure in the fuel tank. For reasons of emission prevention, the dissipated fuel vapors are generally routed through an activated charcoal filter which absorbs the volatile hydrocarbons. The remaining air is released into the environment.

In order to facilitate the removal of fuel from the fuel tank, it must be possible at the same time to aerate the fuel tank. Many motor vehicles moreover have devices for monitoring the tightness of the fuel tank so that leaks can be detected early. For purposes of leak diagnosis, air is conventionally pumped into the fuel tank by means of a pump until a specified overpressure arises. If the overpressure cannot be built up or if the overpressure diminishes again too quickly, there is a leak in the fuel system. The leak diagnosis device can then deliver a corresponding warning to the driver.

In particular, the air which has been fed into the tank within the framework of leak diagnosis must be filtered to protect the pump of the leak diagnosis system against particles.

Aeration and ventilation lines for the fuel tank are generally made separately since the requirements with respect to the positioning of aeration and ventilation openings are different. The aeration opening must be mounted at a moisture-protected site, while the ventilation opening must be at a site from which the emerging gases can be easily released into the environment. On the tank side, there is generally only a single opening for the two systems. This tank-side opening is connected to the aeration opening or the ventilation opening as needed by means of a three-way valve.

The object of this invention is to make available a device of the initially mentioned type which is especially compact and space-saving.

SUMMARY OF THE INVENTION

A device of this type for aeration and ventilation of a fuel system of a motor vehicle has a pipe union for connecting the device to the fuel system. This pipe union is connected to a three-way valve by means of a connecting element and can be fluid-connected alternately to an air inlet opening or an air outlet opening of the device via the three-way valve. In the flow path between the three-way valve and the air inlet opening, there is a filter element to remove particles from the intaken air. The filter element, the connecting element, and the three-way valve are accommodated in a common housing so that an especially compact and thus space-saving device is obtained which can be made available as a pre-assembled mounted module.

Preferably, the filter element surrounds the connecting element at least in certain sections. This arrangement makes especially good use of the available installation space. Alternatively, the connecting element can also surround the filter element at least in certain sections.

In one preferred embodiment of the invention, the three-way valve is designed as a passive flap valve. Therefore, active components can be omitted; this constitutes especially high fail-safe performance and operational reliability of the ventilation process. The passive flap valve changes its position depending on the flow and pressure conditions. If an overpressure prevails on the side of the pipe union, the three-way valve clears an air path to the air outlet opening and at the same time closes the air inlet opening. Air flowing into the pipe union from the fuel system can therefore escape through the air outlet opening to the environment.

If, conversely, a negative pressure prevails on the side of the pipe union relative to the air inlet opening, an air path is cleared by the three-way valve from the air inlet opening via the filter element to the pipe union, and at the same time the air outlet, opening is closed. Ambient air can flow via the filter element to the pipe union and from the latter into the fuel system.

Preferably, there is at least one two-way valve between the three-way valve and the filter element. This other valve can also be made as a passive flap valve; it is used as a safety valve for the three-way valve.

Preferably, the pipe union and the air outlet opening are located on opposite face surfaces of the housing. The air inlet opening is preferably likewise located on one of the face surfaces and is especially made more advantageously as an annular gap in one of the face surfaces. Alternatively, the air inlet opening can likewise be connected to a pipe union.

BRIEF DESCRIPTION OF THE DRAWING

FIG. 1 shows a cutaway perspective view of one exemplary embodiment of a device according to the invention for aeration and ventilation of a fuel system of a motor vehicle;

FIG. 2 shows the flow conditions of the device according to FIG. 1 when a tank system is being aerated;

FIG. 3 shows a schematic of the flow conditions in the device as shown in FIG. 1 when the tank system is being vented.

DETAILED DESCRIPTION OF THE PREFERRED EMBODIMENT OF THE INVENTION

A device designated as a whole as 10 for aeration and ventilation of a fuel system of a motor vehicle comprises a pipe union 12 via which it can be connected to the fuel system. Typically, a hose is connected to the pipe union 12 and to a leak diagnosis pump of the motor vehicle. The pipe union 12 is made integral with one housing part 14 which, together with another housing part 16, forms the housing 18 of the device 10. The housing 18 is made cylindrical and is attached coaxially to the pipe union 12.

In the interior 20 of the housing 18, a pipe 22 is connected to the pipe union 12. The pipe 22 discharges into a valve chamber 24 of a three-way valve 26. The three-way valve 26 is made as a flap valve. A first valve flap 28 of the three-way valve borders the valve chamber 24 of another connecting sleeve 30, which discharges into the air outlet opening 32.

The valve seat of the valve flap 28 is designed such that the valve flap 28 is closed when a higher pressure prevails on the side of the air outlet opening 32 than on the side of the pipe union 12. Conversely, the flap 28 opens when the pressure in the pipe union 12 and thus within the pipe 22 exceeds the pressure in the connecting sleeve 30 and thus on the side of the outlet opening 32.

If an overpressure arises in the fuel tank of the motor vehicle, the gases causing the overpressure can flow into the device 10 via the activated charcoal filter and the pipe union 12. The valve flap 28 opens so that the gases can escape through the outlet opening 32 to the environment. Another annular valve flap 34 concentrically surrounds the end region 36 of the pipe 22 and closes the valve space 24 relative to an intermediate chamber 38. The intermediate chamber 38 is bordered by another valve flap 40 which separates the intermediate chamber 38 from a filter element 42. The valve flaps 34 and 40 close in the same direction.

When there is a negative pressure in the fuel system, the valve flaps 34 and 40 open, whereas the valve flap 28 closes. Ambient air can flow through the filter 42 in the direction of the arrow 50 via an annular channel 44 from an air inlet opening 46, which is made as an annular gap in the jacket surface 48 of the housing 18, as shown in FIG. 2. After passing through the filter 42, the air flows through the intermediate chamber 38 and the valve chamber 42 along the arrows 52 into the pipe 22. The intaken air can finally flow into the fuel system via the pipe union 12 in the direction of the arrow 54 and equalize a negative pressure. In so doing, particles are removed by the filter 42 so that they cannot be delivered into the fuel system.

The invention claimed is:

1. A device for aeration and ventilation of a fuel system of a motor vehicle, comprising:
   a housing;
   a first means disposed in said housing defining a first fluid flow path having a first exterior port relevant to said housing communicable with said fuel system and a second exterior port relevant to said housing communicable with the atmosphere;
   a first valve disposed in said first fluid flow path, biased closed and functional to open upon flow of fluid from said first exterior port to said second exterior port of said first fluid flow path;
   a second means disposed in said housing defining a second fluid flow path having a third exterior port relevant to said housing communicable with the atmosphere and a second port communicating with said first fluid flow path between said first exterior port of said first fluid flow path and said first valve; and
   a second valve disposed in said second fluid flow path between said third exterior port and said first flow path, between said first exterior port and said first valve, biased closed and functional to open upon flow of fluid from said third exterior port of said second fluid flow path to said first exterior port of said first fluid flow path.

2. The device of claim 1 wherein said valves comprise flapper valves.

3. The device of claim 1 including a filter disposed in said second fluid flow path between said third exterior port thereof and said second valve.

4. The device of claim 1 wherein said first valve in said first flow path is functional to open responsive to a first pressure differential between said fuel system and said atmosphere, and said second valve in said second flow path is functional to open responsive to a second pressure differential between said fuel system and said atmosphere.

5. The device of claim 4 wherein said first pressure differential provides for purging said fuel system and said second pressure differential provides for ventilating fuel vapors from said fuel system.

\* \* \* \* \*